H. LAW.

POTATO PEELER.

No. 9,930. Reissued Nov. 15, 1881.

WITNESSES:

C. Navin

C. Sedgwick

INVENTOR:

H. Law

BY Munn & Co.

ATTORNEYS.

UNITED STATES PATENT OFFICE.

HERVEY LAW, OF CHATHAM, NEW JERSEY.

POTATO-PEELER.

SPECIFICATION forming part of Reissued Letters Patent No. 9,930, dated November 15, 1881.

Original No. 242,660, dated June 7, 1881. Application for reissue filed July 18, 1881.

*To all whom it may concern:*

Be it known that I, HERVEY LAW, of Chatham, in the county of Morris and State of New Jersey, have invented a new and Improved Potato-Peeler, of which the following is a specification.

My invention aims to provide a simple culinary machine for rapidly and perfectly peeling potatoes, which are usually of very irregular forms and sizes.

My invention consists in the combination, with devices for rotating the potato, of the cutting-tool arm hinged at its lower end to the carriage, and provided at its upper end with a cutter-head pivoted on a horizontal axis to a bracket and furnished with a knife sharply curved to enter the eye of a potato; and it also consists in the combination, with the rotary screw-spindle, of a slotted hook-arm connected by screws with the arm of the tool-carriage, as hereinafter more fully described.

Figure 1:
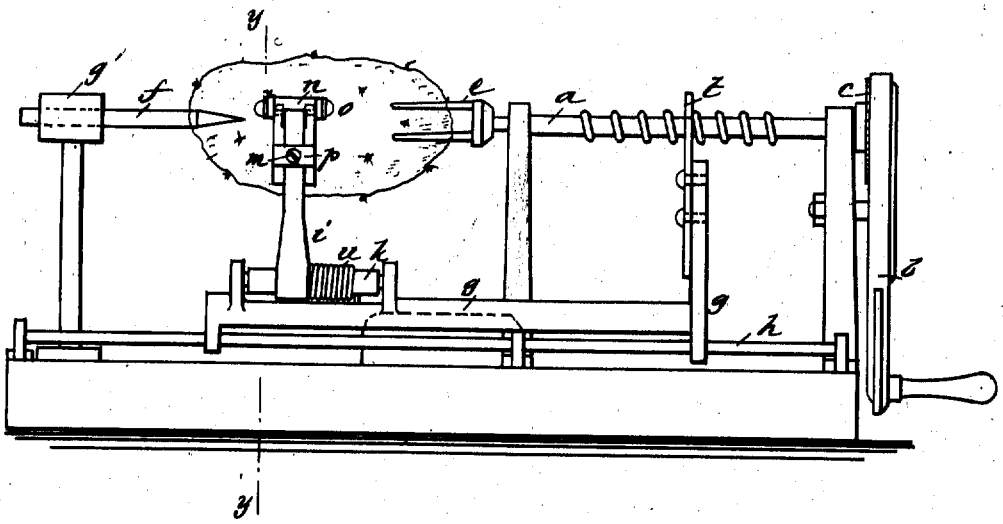
Figure 4:
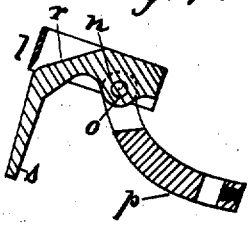
Figure 2:
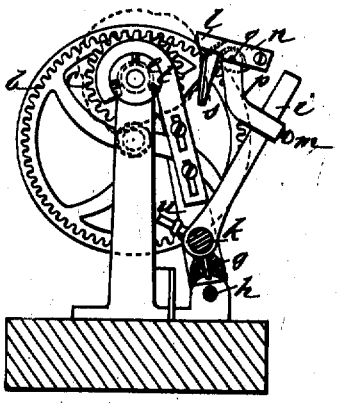
Figure 3:
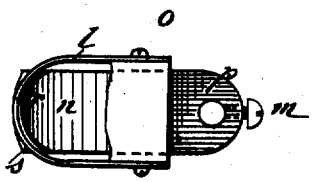

In the accompanying drawings, Figure 1 is a longitudinal side elevation of my machine. Fig. 2 is a cross-section thereof taken on the line *y y* of Fig. 1; and Fig. 3 is an enlarged plan view of the cutter and its guide. Fig. 4 is a sectional detail view of the same.

Similar letters of reference indicate corresponding parts.

In the drawings, *a* indicates a rotary spindle, which is driven by the hand-wheel *b*, which has an internally-cogged rim that meshes with the pinion *c* on the shaft, as illustrated. The inner end of the spindle has a forked head, *e*, on which the potato is spitted and is revolved thereby, and the opposite end of the potato is centered, guided, and sustained by the spindle *f*, which slides through the elevated collar *g'*, which supports it in line with the shaft *a*.

*g* is a sliding tool-carriage, which is guided on the longitudinal way or rod *h* on one side of the machine, and to which a longitudinal motion is imparted from the screw on the spindle *a* by the engagement therewith of a hook-shaped arm, *t*, extending from one end of the carriage, which thus serves as a nut on the said screw, whereby the carriage may be propelled back or forth by the rotation of the spindle.

From the tool-carriage rises an upright tool-arm, *i*, which is hinged to the carriage on the horizontal pivot or rock-shaft *k*, and is constantly pressed forward toward the work by the spring *u*, arranged as shown. This tool-arm carries near the top a cutter-head or knife-stock, *n*, which is pivoted to work perpendicularly, or in the line of the cut, on a horizontal axis, *o*, to a bracket or arm, *p*, which is vertically adjustable on the vertical arm *i*, and is held at the desired point by the set-screw *m*.

To the cutting-head or knife-stock *n* is fixed the knife or cutter *l*, which has the shape of a bail or semi-hoop, its cutting-edge being on the under side of its curved bend which overlies a beveled face, *r*, on the cutting-head, forming an opening through which the chip or peel cut off by the knife-edge escapes. The cutting-head or knife-stock is formed with the downward extension *s*, which is adapted to lie tangentially against the curved surface of the potato, while the edge of the knife is always presented to the potato at a slight angle to the point of contact of the potato with the face of the cutter. It will hence be seen that as the cutting-head is pivoted to the arm *p*, and is constantly forced horizontally toward the potato by the spring *u*, and as the extension *s* stands nearly perpendicular to and extends some distance below the curved knife and along the side of the potato, and is moved by the tool-carriage in a direct line the whole length of the potato, and as the cutting-head and knife are free to yield laterally to all the irregularities of the surface of the potato, the cutting-edge will be thus at all times held in a free and natural and practically uniform position, so as to cut freely and easily over all parts of the potato, and will thus remove the peel perfectly and of a regular thickness throughout without binding upon the potato or breaking it from the fork and centering-spindle, as would be the case if differently arranged.

The hook *t*, which engages with the screw-spindle *a*, has a slot-and-screw connection with the end of the carriage, whereby it may be raised out of or dropped into engagement with the screw at any point of its traverse, which enables the carriage to be moved back or forth independently of the rotation of the screw, to set the carriage to a longer or shorter travel, in accordance with the length of the potato to be peeled, and also to admit of moving the carriage back to the starting-point to begin on the next potato without the necessity of reversing the motion of the screw, heretofore required.

In defining my invention more clearly, I would state that I am aware that a cutter for apple-parers has been pivoted or arranged to rock in vertical planes or at right angles to the axis of revolution of the apple, and I do not claim this, broadly. I am aware, also, on the other hand, that a bowed knife is not new, and I also disclaim this *per se*. I do not know, however, that a bowed knife has ever been combined with a pivoted knife-stock, and this is the substance of my invention and the construction that makes a practical potato-peeler. If nature had made potatoes with longitudinal indentations, simply a pivoted knife-stock and straight knife would peel them, for the pivotal character of the knife-stock would allow a flat knife then to descend into the grooves when crossing them; but as potatoes grow with eyes which are in the nature of circumscribed cavities or indentations, it will be seen that no amount of tilting of the knife will avail anything for peeling these cavities unless the shape of this knife is such as to permit it to descend into the cavities. The pivotal character of the knife-stock and the bowed character of the knife have then, in a potato-peeler, a special value and coaction which is not required in an apple-parer; and in distinguishing my invention from the patent to Keyes, No. 15,133, granted June 17, 1856, I would state that the very slight curve there shown in the knife as carried by its pivoted stock is not sufficient to enter the circumscribed cavities of the starchy tuber, but the curvature there given is only to allow the ends of the knife to be above and sever the edges of the apple-peel while the center portions are cutting underneath the same. In my case the knife must be sharply curved or so pronounced in curvature as to enter said circumscribed cavities, and for this purpose I employ a bow-spring knife.

Having thus fully described my invention, I claim as new and desire to secure by Letters Patent—

1. The combination, with devices for rotating the potato, of the cutting-tool arm, hinged at its lower end to the carriage and provided at its upper end with a cutter-head pivoted on a horizontal axis to a bracket, and furnished with a knife sharply curved to enter the eye of a potato, substantially as shown and described.

2. The combination, with the rotary screw-spindle *a*, of the slotted hook-arm *t*, connected by screws with the arm *g* of the tool-carriage, to adapt it to be used as described.

HERVEY LAW.

Witnesses:
JOHN W. TOMPKINS,
WM. H. LUM.